United States Patent
Cooper et al.

(10) Patent No.: US 9,195,292 B2
(45) Date of Patent: Nov. 24, 2015

(54) CONTROLLING REDUCED POWER STATES USING PLATFORM LATENCY TOLERANCE

(71) Applicant: Intel Corporation, Santa Clara, CA (US)

(72) Inventors: Barnes Cooper, Tigard, OR (US); Jeffrey R Wilcox, El Dorado Hills, CA (US); Michael N Derr, El Dorado Hills, CA (US); Neil W Songer, Santa Clara, CA (US); Craig S Forbell, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 226 days.

(21) Appl. No.: 13/927,746

(22) Filed: Jun. 26, 2013

(65) Prior Publication Data

US 2015/0006923 A1  Jan. 1, 2015

(51) Int. Cl.
*G06F 1/32*  (2006.01)

(52) U.S. Cl.
CPC ............ *G06F 1/3206* (2013.01); *G06F 1/3234* (2013.01); *G06F 1/3243* (2013.01)

(58) Field of Classification Search
CPC ..... G06F 1/3203; G06F 1/3287; G06F 1/325; G06F 13/24; G06F 1/3206; G06F 1/3234; G06F 1/3243
See application file for complete search history.

(56) References Cited

U.S. PATENT DOCUMENTS

| | | |
|---|---|---|
| 2009/0249103 A1 | 10/2009 | Jeyaseelan et al. |
| 2010/0169683 A1 | 7/2010 | Wang et al. |
| 2010/0169684 A1 | 7/2010 | Jeyaseelan et al. |
| 2012/0079482 A1* | 3/2012 | Wang et al. .................. 718/100 |
| 2012/0254644 A1 | 10/2012 | Knolla et al. |
| 2013/0007492 A1 | 1/2013 | Sokol, Jr. et al. |

FOREIGN PATENT DOCUMENTS

| | | |
|---|---|---|
| EP | 1471431 B1 | 10/2004 |
| EP | 2073097 A2 | 6/2009 |
| JP | 2006072698 A | 3/2006 |

OTHER PUBLICATIONS

EP office action issued in corresponding EP14174593.5 dated Feb. 10, 2015, (6 pages).

* cited by examiner

*Primary Examiner* — Leon Flores
(74) *Attorney, Agent, or Firm* — Trop, Pruner & Hu, P.C.

(57) ABSTRACT

In an embodiment, a processor includes a plurality of cores and power management logic. The power management logic may be to, in response to a first break event during a reduced power state in the processor, set an exit timer based on a platform latency tolerance, block a first plurality of break events from interrupting the reduced power state, and in response to a expiration of the exit timer, terminate the reduced power state. Other embodiments are described and claimed.

20 Claims, 9 Drawing Sheets

CONTROLLING REDUCED POWER STATES USING PLATFORM LATENCY TOLERANCE

TECHNICAL FIELD

Embodiments relate generally to power management of electronic devices.

BACKGROUND

Conventionally, an electronic device may include one or more power states. Each power state may correspond to a particular performance level and power consumption. Further, each power state may be associated with a particular level of power consumption. The use of such power states may decrease the total amount of electrical power consumed by the electronic device.

DETAILED DESCRIPTION

Figure 1:
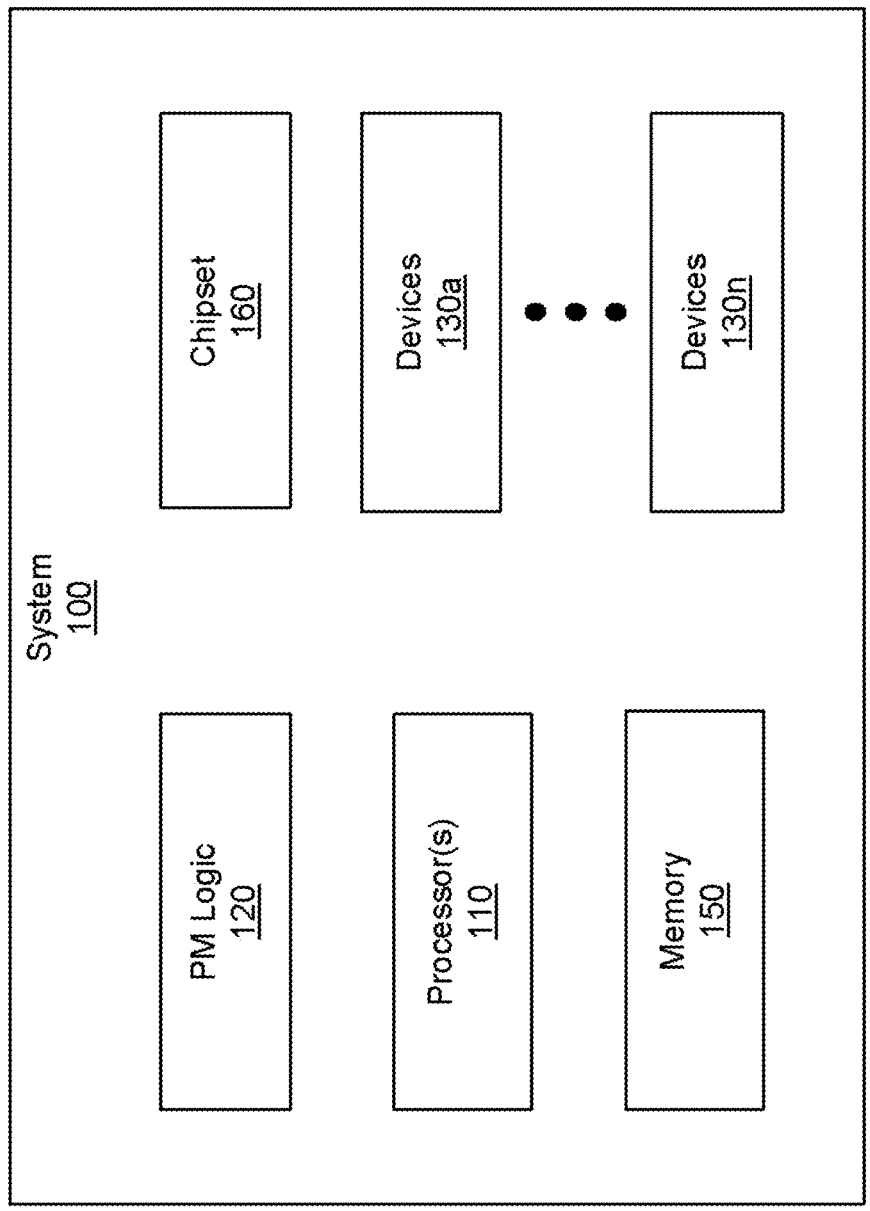
FIG. 1 is a block diagram in accordance with one or more embodiments.

Some computing systems include functionality to determine a power state based on latency tolerance. Conventionally, such systems may select the deepest (i.e., least power consumption) power state to be entered by determining an overall system latency tolerance, and then rounding off to the deepest power state that has a response time less than the overall platform latency tolerance. Further, such systems typically return to a full power state upon receiving a break event. Thus, conventional systems may not use all available time in a low power state. Therefore, some potential power savings may not be not realized.

In accordance with some embodiments, a computer system may include functionality to defer an exit from a reduced power state based on a negotiated platform latency tolerance. Further, the computer system may include functionality to block some types of break events during the period of the reduced power state. In this manner, a forced delay may be imposed on some break events. Therefore, embodiments may increase the time spent in the reduced power state, and thereby reduce overall power consumption.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below.

Moreover, the apparatus, methods, and systems described herein are not limited to physical computing devices, but may also relate to software optimizations for energy conservation and efficiency. As will become readily apparent in the description below, the embodiments of methods, apparatus, and systems described herein (whether in reference to hardware, firmware, software, or a combination thereof) are vital to a 'green technology' future, such as for power conservation and energy efficiency in products that encompass a large portion of the US economy.

Note that embodiments described herein may be independent of and/or complementary to an operating system (OS)-based mechanism, such as the Advanced Configuration and Power Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Referring to FIG. 1, shown is a block diagram of a system 100 in accordance with one or more embodiments. In some embodiments, the system 100 may be all or a portion of an electronic device or component. For example, the system 100 may be a cellular telephone, a computer, a server, a network device, a controller, an appliance, etc. In another example, the system 100 may be a multi-core processor or a System on a Chip (SoC).

As shown in FIG. 1, the system 100 may include processor(s) 110, PM logic 120, memory 150, chipset 160, and devices 130a-130n. The memory 150 may be any type of computer memory (e.g., dynamic random access memory (DRAM), static random-access memory (SRAM), non-volatile memory, etc.). In some embodiments, the processor(s) 110 may include multiple cores. Further, in embodiments in which the system 100 is a processor or SoC, the processor(s) 110 may be processing cores.

In some embodiments, the devices 130a-130n may be any hardware/software components associated with the system 100. The devices 130a-130n may include external devices coupled to the system 100, internal devices installed in the system 100, software installed or executing on the system 100, etc. For example, in some embodiments, the devices 130a-130n may include one or more of a peripheral device, a printer, a scanner, a storage drive, a camera, a network adapter, a host controller, a memory controller, a network controller, a graphics controller, a hard disk controller (HDD), an audio controller, a software application, a device driver, an operating system, etc.

In one or more embodiments, the chipset 160 may include functionality to support the processor 110, memory 150, and/or devices 130a-130n. For example, the chipset 160 may include functionality such as input/output control, memory access, display/audio interface, clocking, etc. In some embodiments, the chipset 160 may include a platform controller hub (PCH).

In one or more embodiments, the PM logic 120 may include functionality to receive latency time information from the various components of the system 100 (e.g., devices 130, memory 150, chipset 160, etc.). In some embodiments, the latency time information for each component may be based at least in part on the maximum response latency that the component may tolerate without adversely affecting its functionality and/or performance. Further, in some embodiments, the PM logic 120 may receive the latency time information via a latency tolerance messaging (LTM) system (e.g., using specialized notification packets to communicate latency tolerance information).

In one or more embodiments, the PM logic 120 may include functionality to determine an overall platform latency tolerance (PLT) based on the received latency time information. For example, in some embodiments, the PM logic 120 may compare the latency time requirements of various components of the system 100, and may determine the PLT based on the tightest latency constraint (e.g., the component having the smallest latency time).

In one or more embodiments, the PM logic 120 may control the duration of a power state based on the negotiated PLT. For example, the PM logic 120 may set an exit timer to transition out of a reduced power state in the system 100. In some embodiments, the PM logic 120 may initiate the exit timer in response to break event. Further, in some embodiments, the PM logic 120 may set the exit timer to a time value equal to the PLT minus a wake time (e.g., the time required to return to a normal power state). Thus, in some embodiments, the PM logic 120 may enable the reduced power state to be maintained as long as possible under the constraint of the PLT.

In one or more embodiments, the PM logic 120 may include functionality to block break events. For example, in some embodiments, the PM logic 120 may block a first type of break event from interrupting a current power state until the exit timer expires. Further, in some embodiments, the PM logic 120 may allow a second type of break event to interrupt or terminate the current power state before the exit timer expires. In some embodiments, the first type of break event may be non-critical or deferrable break events. For example, the first type of break event may include direct memory access (DMA) accesses, non-critical interrupts, non-critical device traffic, etc. Further, in some embodiments, the second type of break event may be critical or non-deferrable break events. For example, the second type of break event may include critical timers (e.g., advanced programmable interrupt controller (APIC) timer, time stamp counter (TSC) deadline timer, virtualization timers, high precision event timer (HPET)), critical interrupts (e.g., vertical blanking interval interrupt (VBI)), critical device traffic, etc. In one or more embodiments, the PM logic 120 may unblock the first type of break event after terminating or exiting a reduced power state. The unblocked break events may then be granted or processed in a normal manner.

Note that, while the PM logic 120 is depicted in FIG. 1 as being separate from other components of the system 100, embodiments are not limited in this regard. For example, in some embodiments, all or a part of the PM logic 120 may be included in the processor 110 and/or the chipset 160. The functionality of the PM logic 120 is described further below with reference to FIGS. 2A, 2B, and 3.

Figure 2A:
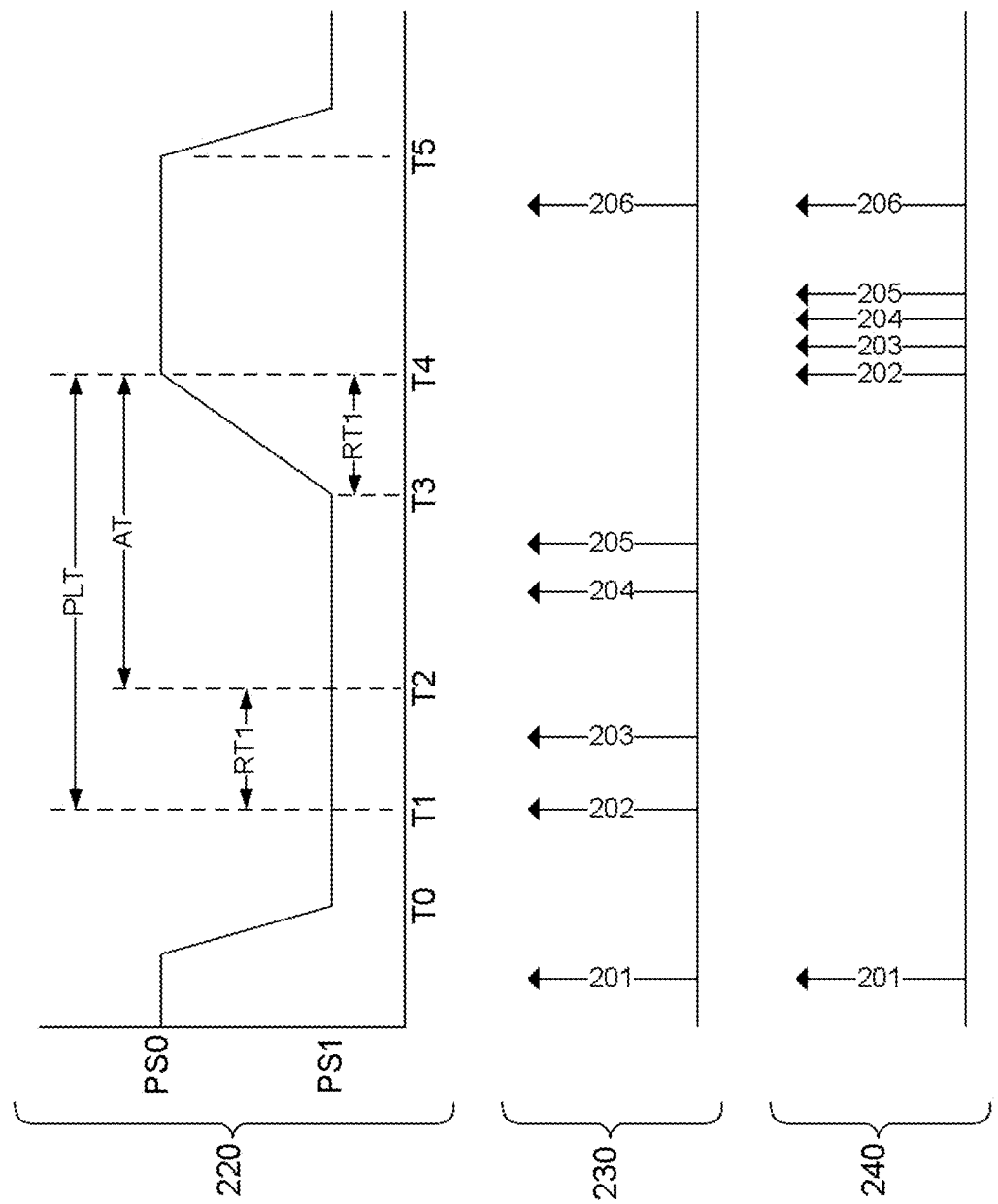
FIGS. 2A-2B are timing diagrams in accordance with one or more embodiments.

Referring now to FIG. 2A, shown are example timing diagrams in accordance with one or more embodiments. In particular, FIG. 2A illustrates an example of the functionality of the PM logic 120 shown in FIG. 1.

As shown, FIG. 2A includes a power diagram 220, a request diagram 230, and a grant diagram 240, which all correspond to the same time period. The power diagram 220 illustrates the power state (PS) of a device (along the vertical axis) at various points in time (along the horizontal axis). Initially, the device (e.g., system 100 shown in FIG. 1) is at a normal power state PS0. As shown, a transition to a reduced power state PS1 is completed at time T0. The device remains at the reduced power state PS1 between times T0 and T3. Further, a transition to the normal power state PS0 is initiated at time T3, and is completed at time T4. The device remains at the normal power state PS0 until time T5, at which time a transition back to the reduced power state PS1 is initiated.

In the example of FIG. 2A, the request diagram 230 shows non-critical break events 201-205 at the times that they are requested. Further, the grant diagram 240 shows the same break events 201-205 at the times that they are granted (i.e., processed or executed).

As shown, the non-critical break event 201 is requested prior to T1, and thus is requested during the normal power state PS0. Further, the non-critical break event 206 is requested between T4 and T5, and thus is also requested during the normal power state PS0. In some embodiments, during a normal power state, the PM logic 120 does not block or defer non-critical break events. Thus, as shown in the grant diagram 240, the non-critical break events 201 and 206 are not deferred, and are thus granted at substantially the same times that they were requested.

As shown, the non-critical break event 202 is requested at time T1, and is the first non-critical event to occur during the reduced power state PS1. In one or more embodiments, the PM logic 120 may respond to the first non-critical event to occur during a reduced power state by scheduling an exit from the reduced power state based on a platform latency time ("PLT") for the device. For example, in some embodiments, the PM logic 120 may set an exit timer equal to the PLT minus a response time ("RT1") to transition from PS1 to PS0. Thus, in the example shown in FIG. 2A, the transition from PS1 to PS0 is initiated at time T3, and is completed at time T4 (i.e., after the response time RT1).

As shown, in this example, the non-critical break events 202, 203, 204 and 205 are requested during the reduced power state PS1 (i.e., between T0 and T3). In some embodiments, the PM logic 120 may cause non-critical break events to be deferred until transitioning out of a reduced power state. Thus, as shown in the grant diagram 240, the non-critical break events 202, 203, 204 and 205 are deferred until time T4 (i.e., when the device fully returns to the normal power state PS0). In this manner, a forced delay equal is imposed on the non-critical break events 202, 203, 204 and 205.

Note that, conventionally, the transition from PS1 to PS0 may be initiated at the request time of the first non-critical event (e.g., the request time T1 for the non-critical event 202), and may thus be completed at time T2. Thus, by deferring the transition to complete at T4 rather than at T2, the PM logic 120 may enable the reduced power state PS1 to be maintained for an additional time ("AT"). In some embodiments, the additional time AT in the reduced power state PS1 may result in reduced power consumption for the device.

Figure 2B:
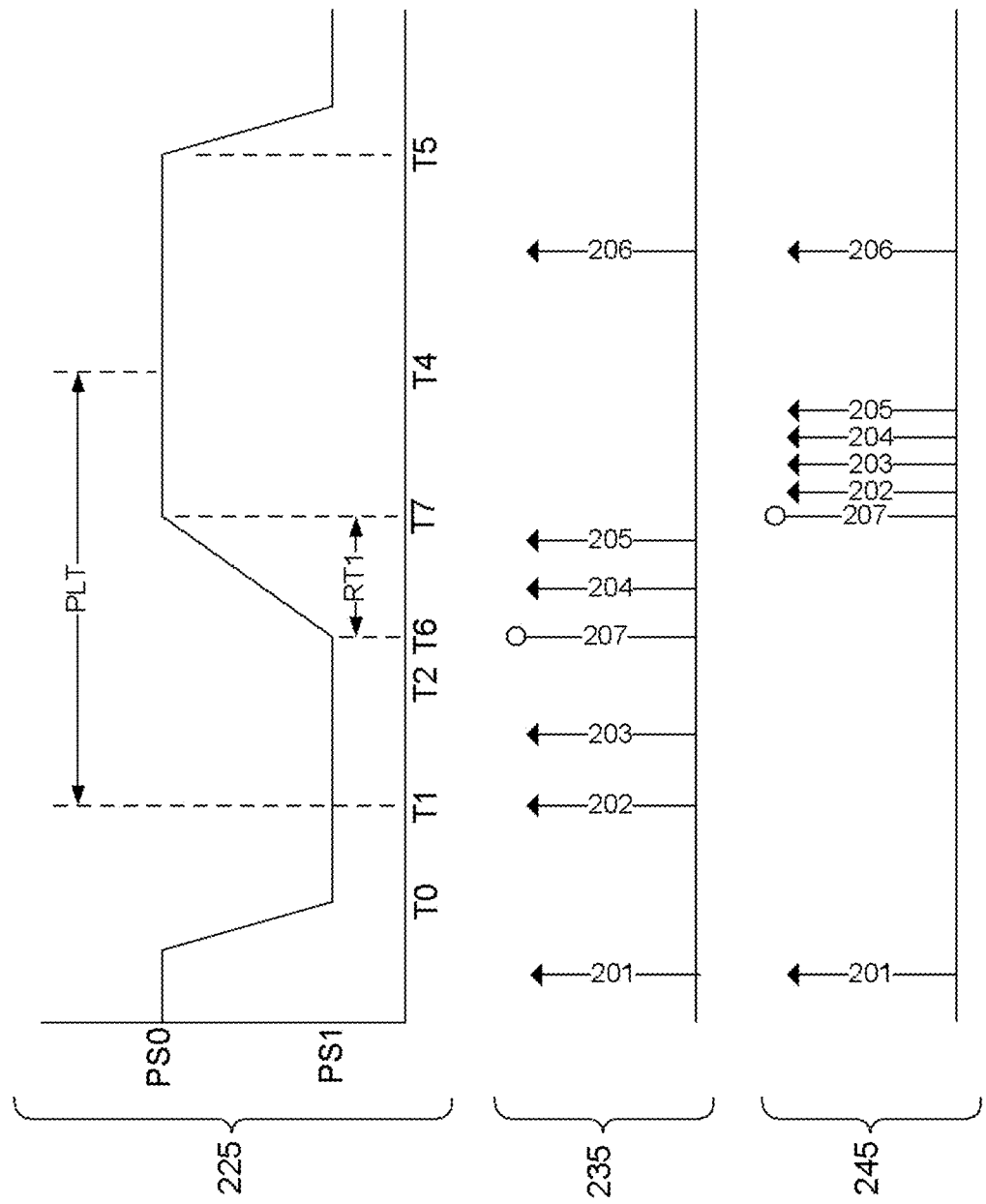

Referring now to FIG. 2B, shown are example timing diagrams in accordance with one or more embodiments. In particular, FIG. 2B illustrates an example similar to the example shown in FIG. 2A. For instance, FIG. 2B includes a power diagram 225, a request diagram 235, and a grant diagram 245, corresponding respectively to diagrams 220, 230, and 240 of FIG. 2A.

Assume that, in the example shown in FIG. 2B, the reduced power state PS1 is again initiated at time T0. Further, as in the example shown in FIG. 2A, the non-critical break event 202 is the first non-critical event to occur during the reduced power state PS1. Thus, an exit timer is again set to complete the transition by the PLT (i.e., at time T4). However, as shown in the request diagram 235, the critical break event 207 is requested at time T6. As discussed above, in some embodiments, the PM logic 120 may terminate a reduced power state in response to a critical break event. Thus, as shown in the power diagram 225, a transition out of PS1 is initiated at T6, and is then completed at time T7. Further, as shown in the grant diagram 245, the critical break event 207 and the non-critical break events 202, 203, 204, and 205 are granted at time T7.

Figure 3:
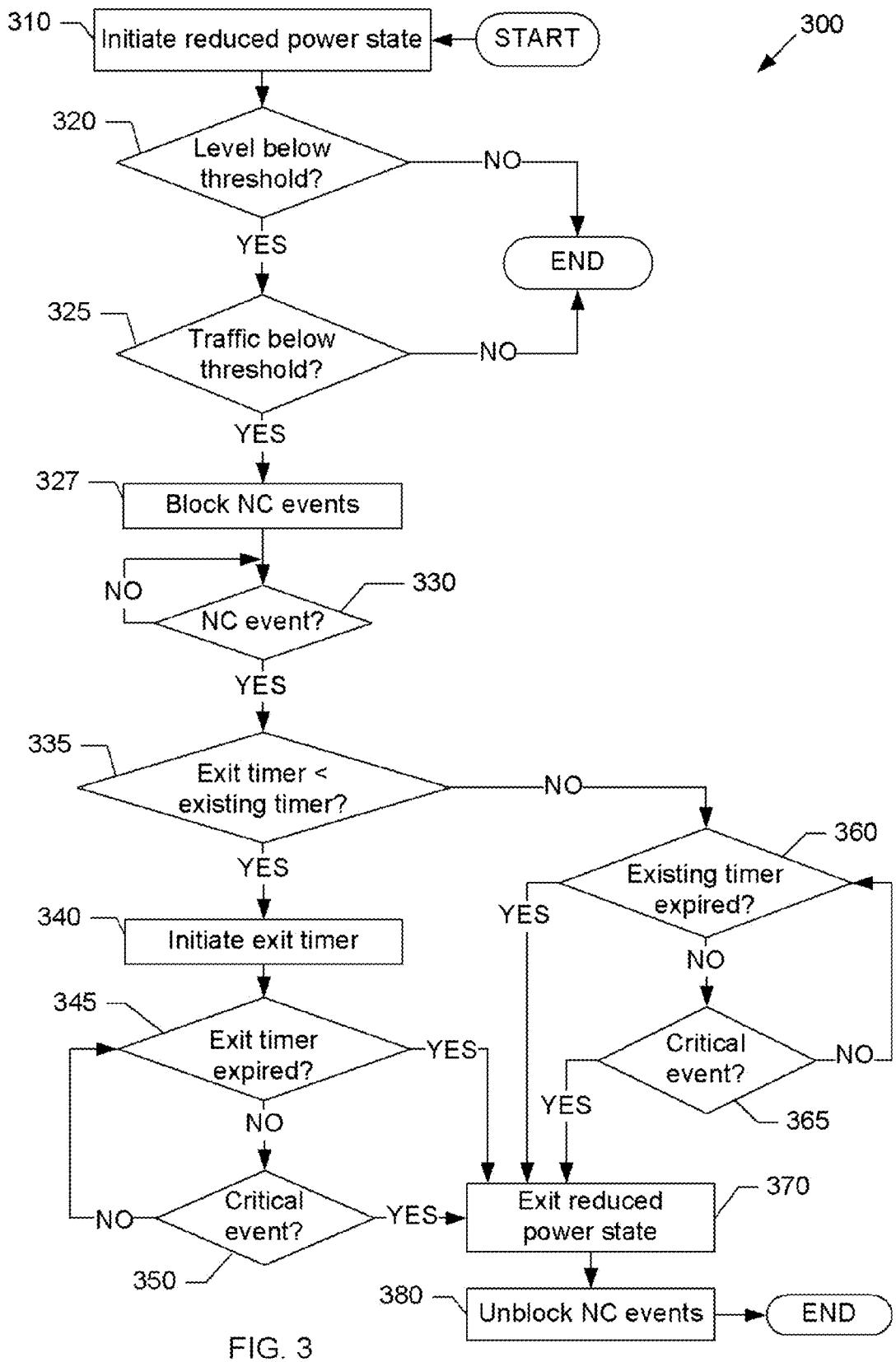
FIG. 3 is a sequence in accordance with one or more embodiments.

Referring now to FIG. 3, shown is a sequence 300 for managing a power state, in accordance with one or more embodiments. In one or more embodiments, the sequence 300 may be part of the PM logic 120 shown in FIG. 1. The sequence 300 may be implemented in hardware, software, and/or firmware. In firmware and software embodiments it may be implemented by computer executed instructions stored in a non-transitory computer readable medium, such as an optical, semiconductor, or magnetic storage device.

At step 310, a reduced power state may be initiated. For example, referring to FIGS. 1 and 2A, the PM logic 120 may initiate a transition from the normal power state PS0 to the reduced power state PS1 at time T1. In some embodiments, the reduced power state may associated with a lower power consumption level than a normal or higher power state.

At step 320, a determination is made about whether the reduced power state is below a defined threshold level. For example, referring to FIG. 1, the PM logic 120 may determine whether the reduced power state is a deeper (e.g., provides less power consumption) than a specific power state. In some embodiments, the defined threshold level may correspond to, e.g., the C2 power state. Further, in some embodiments, the threshold level may be defined based on the amount of power efficiency which is estimated to be available in a specific reduced power state.

If it is determined at step 320 that the new power state is not below the defined threshold level, then the sequence 300 may be terminated. However, if it is determined at step 320 that the new power state is below the defined threshold level, then the sequence 300 continues at step 325.

At step 325, a determination is made about whether bus traffic is below a defined threshold level. For example, referring to FIG. 1, the PM logic 120 may determine whether a bus and/or backbone of the system 100 has not had any traffic for at least a minimum time period (e.g., 5 microseconds, 10 microseconds, etc.).

If it is determined at step 325 that the bus traffic is not below the defined threshold level, then the sequence 300 may terminate. However, if it is determined at step 325 that the bus traffic is below the defined threshold level, then the sequence 300 continues at step 327.

At step 327, non-critical break events may be blocked. For example, referring to FIG. 1, the PM logic 120 may block non-critical break events from interrupting the reduced power state. Such blocking of non-critical break events may include blocking data in a bus or interface (e.g., the internal bus of the I/O controller or backbone) of the system 100. Further, the blocked break events may include, e.g., a DMA transfer, non-critical interrupts, non-critical device traffic, etc.

At step 330, a determination is made about whether a non-critical break event has occurred during the reduced power state (initiated at step 310). For example, referring to FIGS. 1 and 2A, the PM logic 120 may detect the first non-critical break event 202 to occur during the reduced power state PS1. If it is determined at step 330 that a non-critical break event has not occurred during the reduced power state, step 330 may be repeated to continue monitoring for a non-critical break event. However, if it is determined at step 330 that a non-critical break event has occurred, then the sequence 300 continues at step 335.

At step 335, a determination is made about whether an exit timer would expire prior to any existing timer. In some embodiments, the exit timer may be based on a PLT value. For example, referring to FIG. 1, the PM logic 120 may determine the PLT for the system 100 (e.g., based on the component having the smallest latency time). The PM logic 120 may calculate the period of the exit timer as the PLT value minus a wake time. Further, the PM logic 120 may compare the exit timer to the existing timer. If the exit timer is shorter than the existing timer, the PM logic 120 may determine that the exit timer would expire sooner than the existing timer.

If it is determined at step 335 that the exit timer would expire prior to any existing timer, then at step 340, the exit timer may be initiated. For example, referring to FIG. 1, the PM logic 120 may set a exit timer equal to the PLT value minus a wake time.

At step 345, a determination is made about whether the exit timer has expired. For example, referring to FIG. 1, the PM logic 120 may determine whether the exit timer has expired. If it is determined at step 345 that the exit timer has expired, then the sequence 300 continues at step 370 (described below). Otherwise, if it is determined at step 345 that the exit timer has not expired, then the sequence 300 continues at step 350.

At step 350, a determination is made about whether a critical break event has occurred. For example, referring to FIGS. 1 and 2B, the PM logic 120 may determine whether any critical break events (e.g., critical break event 207) have occurred. If it is determined at step 350 that a critical break event has not occurred, the sequence 300 may return to step 345 to continue monitoring expiration of the exit timer. However, if it is determined at step 350 that a critical break event has occurred, then the sequence 300 continues at step 370 (described below).

Returning to step 335, if it is determined that the exit timer would not expire prior to an existing timer, then at step 360, a determination is made about whether the existing timer has expired. If it is determined at step 360 that the existing timer has expired, then the sequence 300 continues at step 370 (described below). Otherwise, if it is determined at step 360 that the existing timer has not expired, then the sequence 300 continues at step 365.

At step 365, a determination is made about whether a critical break event has occurred. If it is determined at step 365 that a critical break event has not occurred, the sequence 300 may return to step 360 to continue monitoring expiration of the existing timer. However, if it is determined at step 365 that a critical break event has occurred, then the sequence 300 continues at step 370.

At step 370, the reduced power state (initiated at step 310) may be terminated. For example, referring to FIGS. 1 and 2A, the PM logic 120 may initiate a transition from the reduced power state PS1 to the normal power state PS0 at time T3.

At step 380, non-critical events may be unblocked. For example, referring to FIG. 1, the PM logic 120 may unblock non-critical break events. Further, in some embodiments, any deferred events may be handled/processed. For example, referring to FIG. 2A, the deferred break events 202, 203, 204, and 205 may be granted or processed when the transition to the normal power state PS0 is completed at time T4. After step 380, the sequence 300 may terminate.

Note that the examples shown in FIGS. 1, 2A, 2B, and 3 are provided for the sake of illustration, and are not intended to limit any embodiments. For instance, while embodiments may be shown in simplified form for the sake of clarity, embodiments may include any number and/or arrangement of additional components (e.g., processors, cores, buses, storage media, connectors, power components, buffers, interfaces, etc.). Further, in some embodiments, the system 100 may be a multi-core processor or a System on a Chip (SoC) integrated on a single die or integrated circuit. It is contemplated that specifics in the examples shown in FIGS. 1, 2A, 2B, and 3 may be used anywhere in one or more embodiments.

Figure 4:
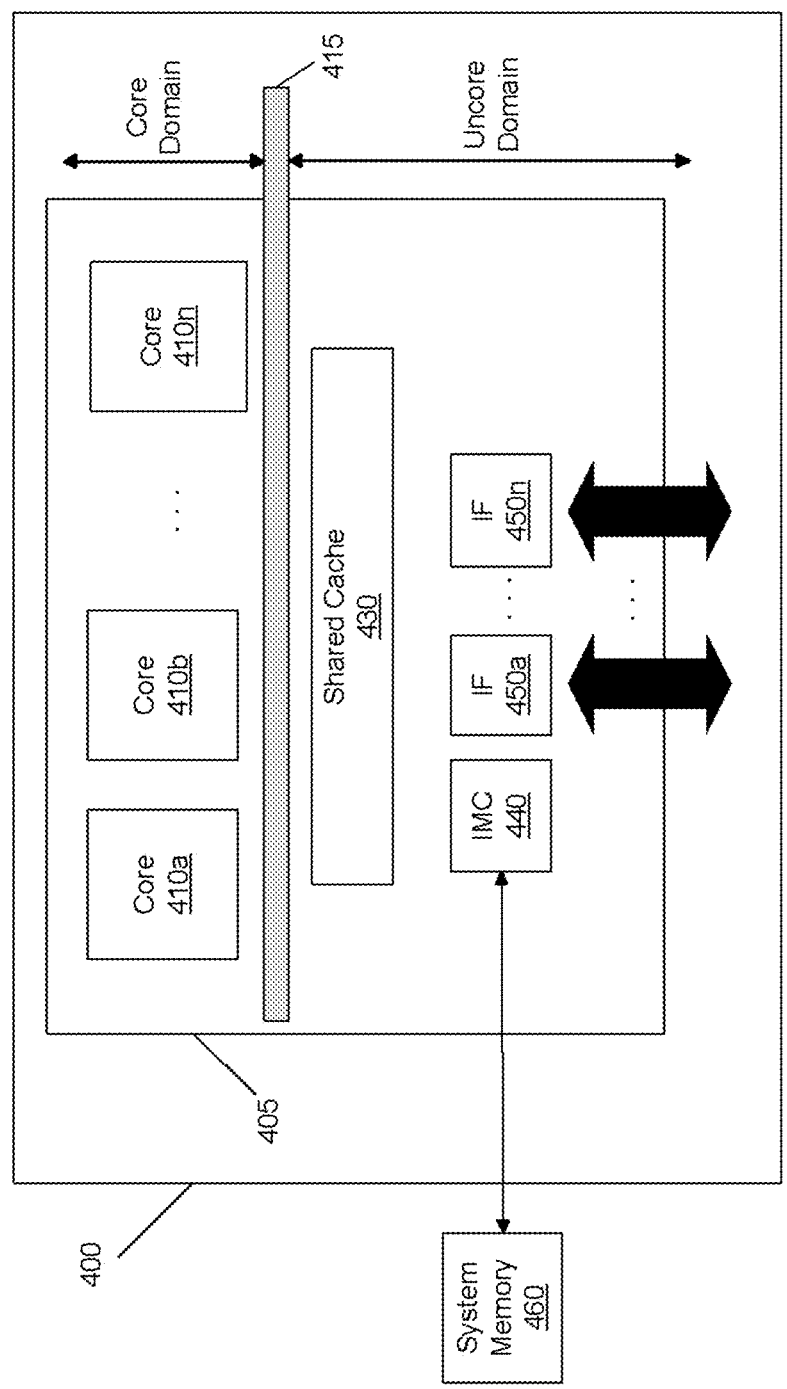
FIG. 4 is a block diagram of a processor in accordance with an embodiment of the present invention.

Referring now to FIG. 4, shown is a block diagram of a processor in accordance with an embodiment of the present invention. As shown in FIG. 4, the processor 400 may be a multicore processor including first die 405 having a plurality of cores 410a-410n of a core domain. The various cores 410a-410n may be coupled via an interconnect 415 to a system agent or uncore domain that includes various components. As seen, the uncore domain may include a shared cache 430. In addition, the uncore may include an integrated memory controller 440, a power control unit (PCU) 470, and various interfaces 450.

With further reference to FIG. 4, the processor 400 may communicate with a system memory 460, e.g., via a memory bus. In addition, by interfaces 450, connection can be made to another processor, or various off-package components such as peripheral devices, mass storage and so forth. In some embodiments, the processor 400 may include some or all of the functionality of the PM logic 120 shown in FIG. 1. While shown with this particular implementation in the embodiment of FIG. 4, the scope of the present invention is not limited in this regard.

Figure 5:
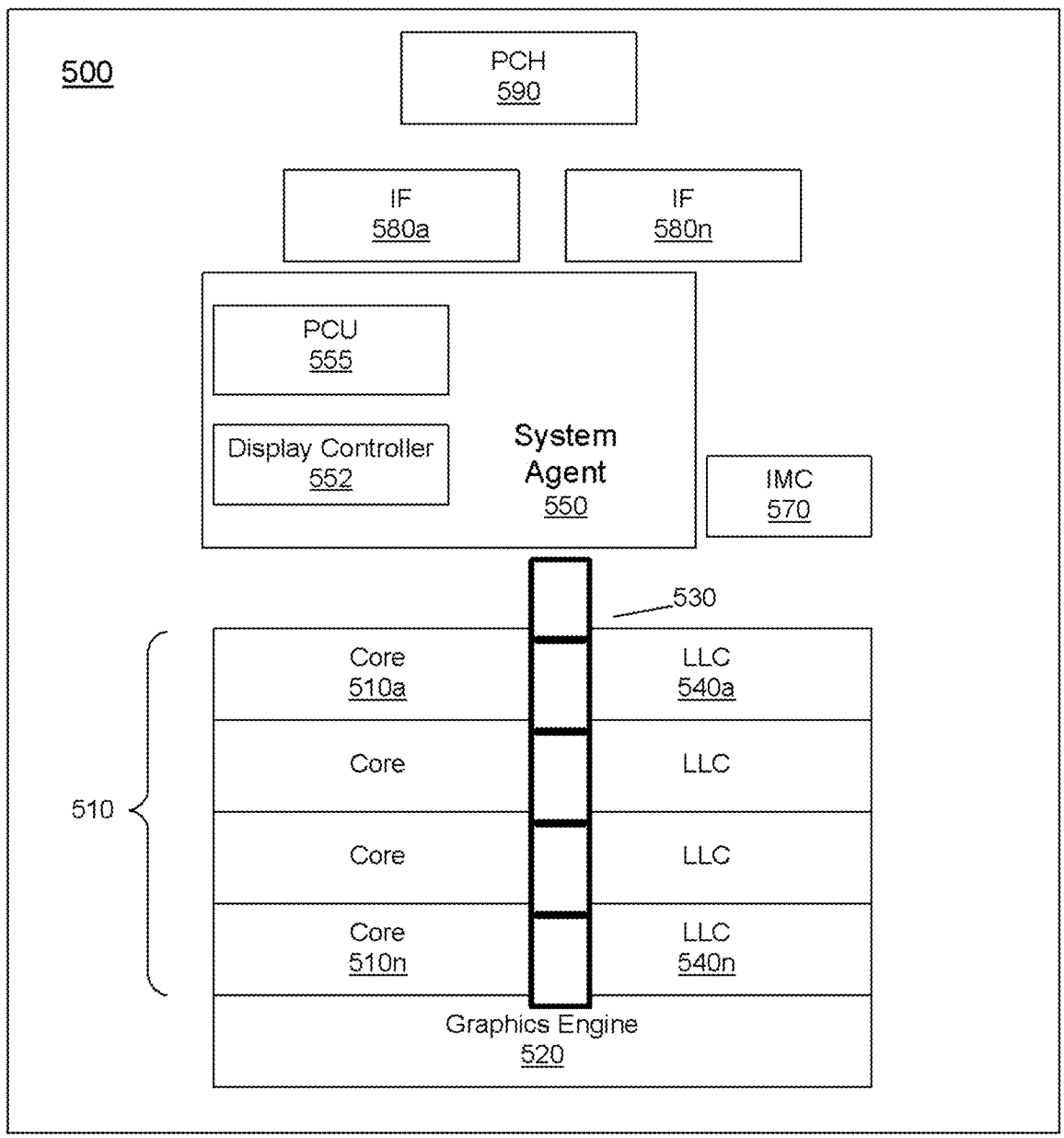
FIG. 5 is a block diagram of a multi-domain processor in accordance with another embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores 510a-510n, a graphics domain 520 can include one or more graphics engines, and a system agent domain 550 may further be present. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) 540a-540n. In various embodiments, LLC 540 may be shared amongst the cores and the graphics engine, as well as various media processing circuitry.

As seen, a ring interconnect 530 thus couples the cores together, and provides interconnection between the cores, graphics domain 520 and system agent circuitry 550. In some embodiments, the ring interconnect 530 may be a multiplexor or crossbar device. In the embodiment of FIG. 5, system agent domain 550 may include display controller 552 which may provide control of and an interface to an associated display. As further seen, system agent domain 550 may also include a power control unit 555 to allocate power to the CPU and non-CPU domains.

As further seen in FIG. 5, processor 500 can further include an integrated memory controller (IMC) 570 that can provide for an interface to a system memory, such as a dynamic random access memory (DRAM). Multiple interfaces 580a-580n may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. As further seen, a peripheral controller hub (PCH) 590 may also be present within the processor 500, and can be implemented on a separate die, in some embodiments. Alternatively, in some embodiments, the PCH 590 may be external to the processor 500. In some embodiments, the processor 500 may include some or all of the functionality of the PM logic 120 shown in FIG. 1. Although shown at this high level in the embodiment of FIG. 5, understand the scope of the present invention is not limited in this regard.

Figure 6:
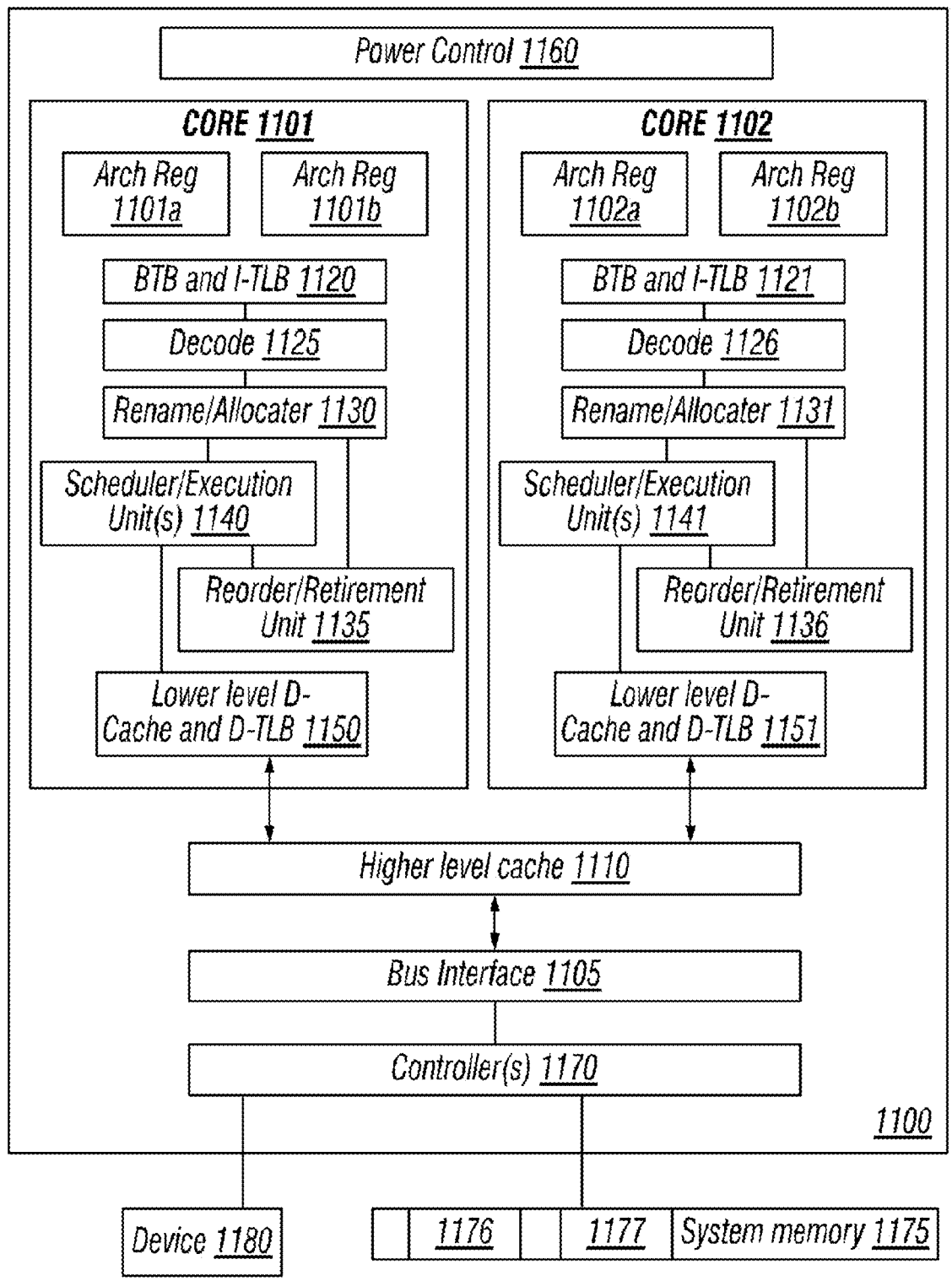
FIG. 6 is a block diagram of an embodiment of a processor including multiple cores.

Referring to FIG. 6, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric. In some embodiments, the processor 1100 may include some or all of the functionality of the PM logic 120 shown in FIG. 1.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 6, includes two cores, cores 1101 and 1102. Here, cores 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As shown, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above.

As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 6, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces. In the depicted configuration, processor 1100 also includes bus interface module 1105 and a power controller 1160, which may perform power management in accordance with an embodiment of the present invention.

Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 7:
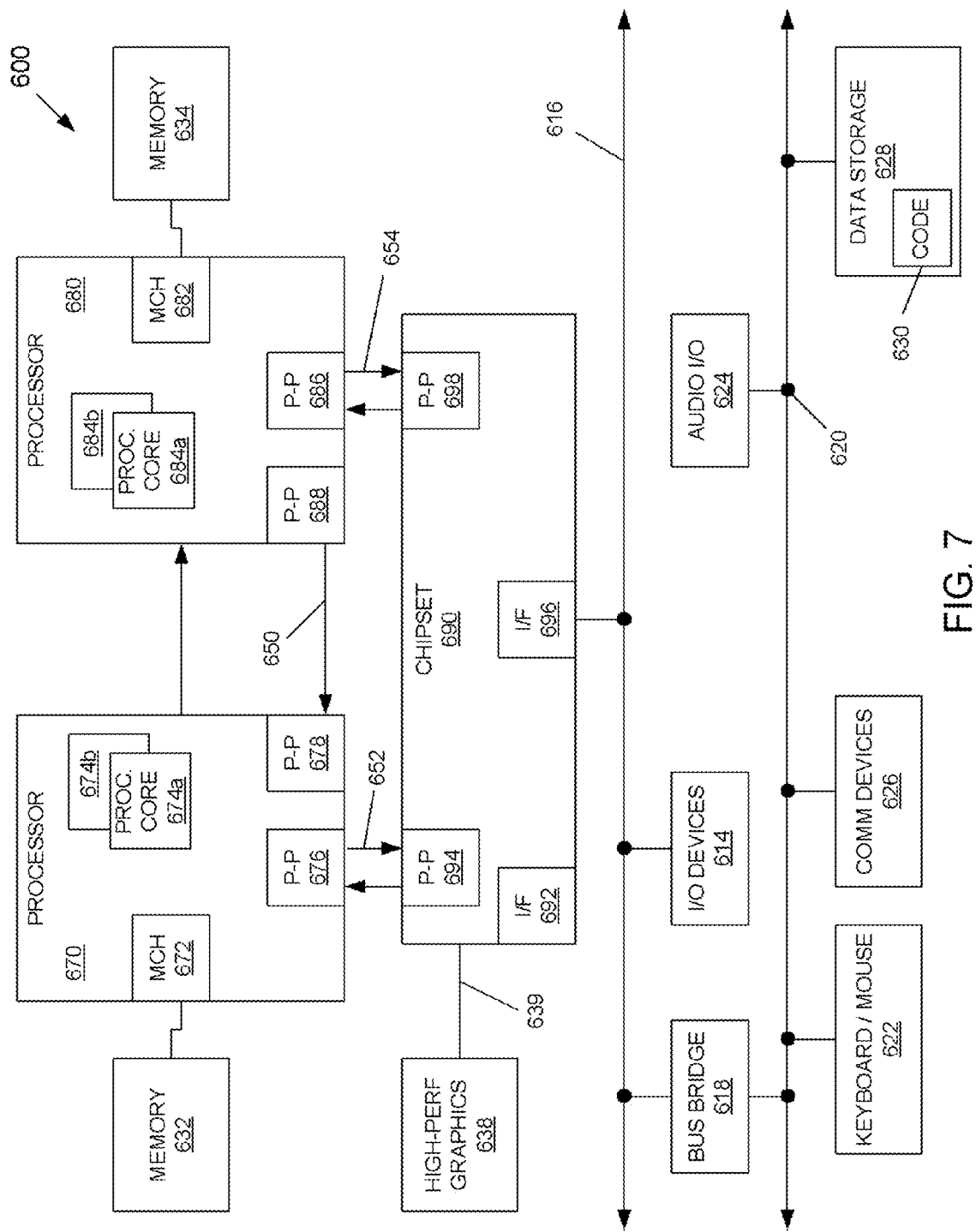
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674*a* and 674*b* and processor cores 684*a* and 684*b*), although potentially many more cores may be present in the processors. In some embodiments, the processors 670, 680 may include some or all of the functionality of the PM logic 120 shown in FIG. 1.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

It should be understood that a processor core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Any processor described herein may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. . . . . The processor may be a special-purpose processor, such as, for example, a network or communication processor, compression engine, graphics processor, co-processor, embedded processor, or the like. The processor may be implemented on one or more chips. The processor may be a part of and/or may be implemented on one or more substrates using any of a number of process technologies, such as, for example, BiCMOS, CMOS, or NMOS.

It is contemplated that the processors described herein are not limited to any system or device. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 8:
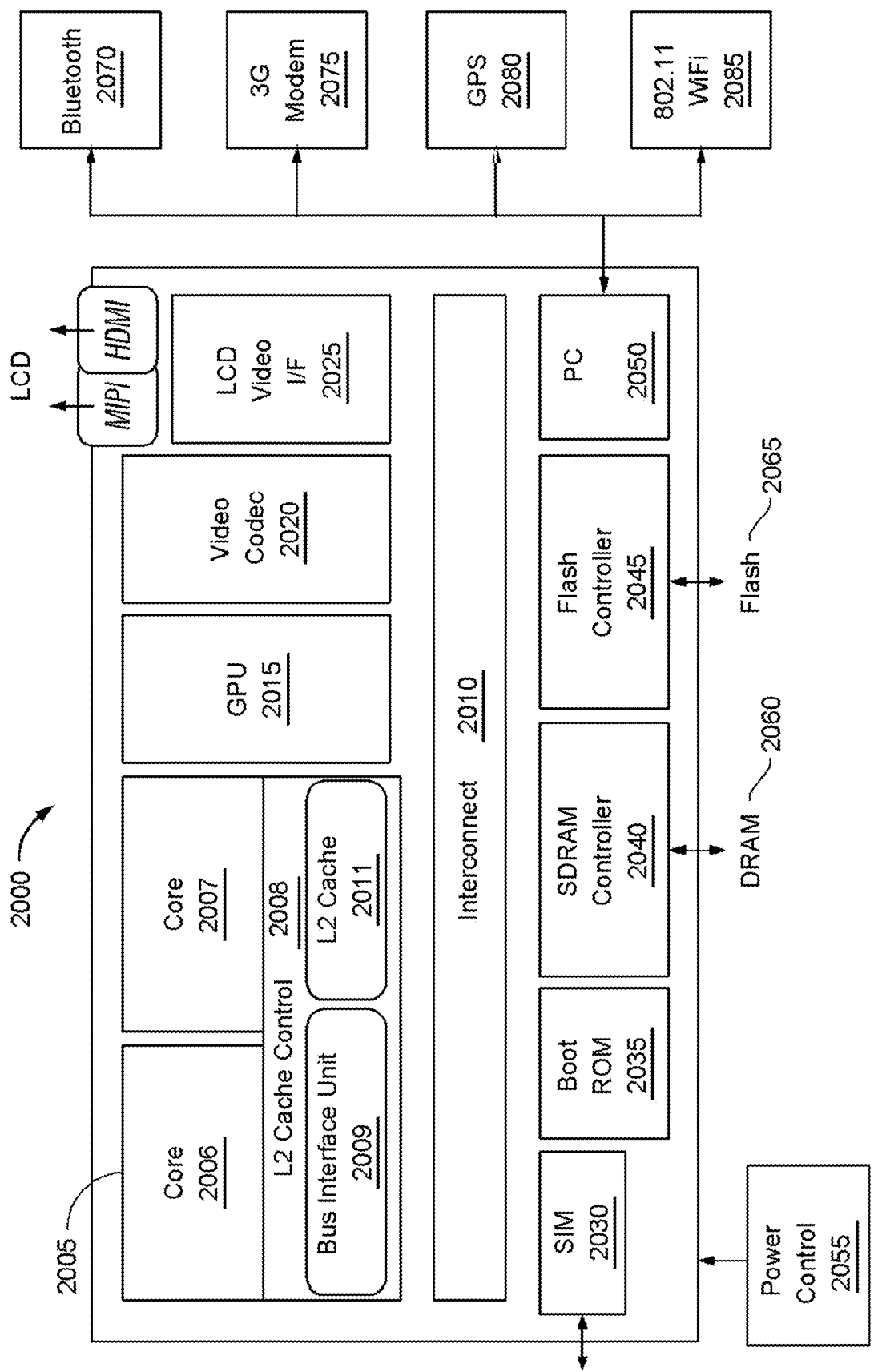
FIG. 8 is a block diagram of a system on a chip in accordance with an embodiment of the present invention.

Turning next to FIG. 8, an embodiment of a system on-chip (SOC) design in accordance with the inventions is depicted. As a specific illustrative example, SOC 2000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network. In some embodiments, SOC 2000 may include some or all of the functionality of the PM logic 120 shown in FIG. 1.

Here, SOC 2000 includes 2 cores—2006 and 2007. The cores 2006 and 2007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 2006 and 2007 are coupled to cache control 2008 that is associated with bus interface unit 2009 and L2 cache 2011 to communicate with other parts of system 2000. Interconnect 2010 includes an on-chip interconnect, such as an IOSF, AMBA, or any other interconnect, which potentially implements one or more aspects of the described invention.

Interface 2010 provides communication channels to the other components, such as a Subscriber Identity Module (SIM) 2030 to interface with a SIM card, a boot rom 2035 to hold boot code for execution by cores 2006 and 2007 to initialize and boot SOC 2000, a SDRAM controller 2040 to interface with external memory (e.g. DRAM 2060), a flash controller 2045 to interface with non-volatile memory (e.g. Flash 2065), a peripheral control Q1650 (e.g. Serial Peripheral Interface) to interface with peripherals, video codecs 2020 and Video interface 2025 to display and receive input (e.g. touch enabled input), GPU 2015 to perform graphics related computations, etc.

In addition, the system illustrates peripherals for communication, such as a Bluetooth module 2070, 3G modem 2075, GPS 2085, and WiFi 2085. Note that a UE includes a radio for communication. As a result, these peripheral communication modules are not all required. However, in a UE some form a radio for external communication is to be included.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following clauses and/or examples pertain to further embodiments. In one example embodiment may be a processor including a plurality of cores and power management logic. The power management logic may be to: in response to a first break event during a reduced power state in the processor, set an exit timer based on a platform latency tolerance; block a first plurality of break events from interrupting the reduced power state; and in response to a expiration of the exit timer, terminate the reduced power state.

In an example, the power management logic may be further to: obtain latency tolerance requirements for each of the plurality of hardware devices; and determine the platform latency tolerance using the latency tolerance requirements.

In an example, the power management logic may be to obtain the latency tolerance requirements using a latency tolerance messaging (LTM) system.

In an example, the power management logic may be to set the exit timer to a time value based at least in part on the platform latency tolerance and a wake time.

In an example, the power management logic may be further to unblock the first plurality of break events after termination of the reduced power state.

In an example, the first plurality of break events comprises non-critical break events. The non-critical break events may include at least one of a direct memory access (DMA) transfer and a non-critical interrupt.

In an example, the power management logic may be further to, in response to one or more critical break events, terminate the reduced power state prior to the expiration of the exit timer. The one or more critical break events may include at least one of an advanced programmable interrupt controller (APIC) timer, a time stamp counter (TSC) deadline timer, a virtualization timer, a high precision event timer (HPET), and a vertical blanking interval interrupt (VBI).

In an example, the power management logic may be further to determine whether the reduced power state is below a specific threshold power state.

In an example, the power management logic may be further to determine whether bus traffic is below a defined threshold level.

In another example embodiment may be a processor including a plurality of cores and power management logic. The power management logic may be to: determine a platform latency tolerance for a system comprising a plurality of components; set, based on the platform latency tolerance, an exit timer for a reduced power state; defer one or more non-critical break events until a termination of the reduced power state; and terminate the reduced power state in response to an expiration of the exit timer.

In an example, the power management logic may be further to initiate the reduced power state in the system.

In an example, the power management logic may be further to: obtain a plurality of latency tolerance requirements from the plurality of components; and determine the platform latency tolerance based on the plurality of latency tolerance requirements.

In an example, the power management logic may be to set the exit timer by subtracting a wake time from the platform latency tolerance.

In an example, the power management logic may be further to terminate the reduced power state in response to one or more critical break events.

In another example embodiment may be a method, the method including: obtaining, by power management logic of a computing system, latency tolerance information for a plurality of devices associated with the computing system; determining a platform latency tolerance based on the latency tolerance information; initiating an exit timer to a time period based on the platform latency tolerance; delaying at least one non-critical break event while the computer system is in a reduced power state; and in response to an expiration of the exit timer, terminating the reduced power state.

In an example, the method may further include calculating the time period by subtracting a wake time from the platform latency tolerance, wherein the wake time is an amount of time to transition from the reduced power state to a normal power state.

In an example, obtaining the latency tolerance information for the plurality of devices may include receiving a plurality of latency tolerance messages from the plurality of devices.

In an example, the method may further include, in response to a critical break event: terminating the reduced power state prior to the expiration of the exit timer; processing the critical break event; and processing the delayed at least one non-critical break event.

In an example, the method may further include initiating the reduced power state in the system.

In an example, the method may further include determining whether the reduced power state is below a specific threshold power state.

In an example, the method may further include determining whether bus traffic is below a defined threshold level.

In an example, the at least one non-critical break event is one of a direct memory access (DMA) transfer and a non-critical interrupt.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments for the sake of illustration, those skilled in the art will appreciate numerous modifications and variations therefrom. It is intended that the appended claims cover all such modifications and variations as fall within the true spirit and scope of this present invention.

What is claimed is:

1. A processor comprising: a plurality of cores; power management logic to: determine a platform latency tolerance for a system comprising a plurality of components; in response to a first break event during a reduced power state in the processor, set an exit timer by subtracting a wake time from the platform latency tolerance; block a first plurality of break events from interrupting the reduced power state; and in response to an expiration of the exit timer, terminate the reduced power state.

2. The processor of claim 1, wherein the power management logic is further to:
   obtain latency tolerance requirements for each of the plurality of components; and
   determine the platform latency tolerance using the latency tolerance requirements.

3. The processor of claim 2, wherein the power management logic is to obtain the latency tolerance requirements using a latency tolerance messaging (LTM) system.

4. The processor of claim 1, wherein the wake time is an amount of time to transition from the reduced power state to a normal power state.

5. The processor of claim 1, wherein the power management logic is further to:
   unblock the first plurality of break events after termination of the reduced power state.

6. The processor of claim 1, wherein the first plurality of break events comprises non-critical break events.

7. The processor of claim 6, wherein the non-critical break events comprise at least one of a direct memory access (DMA) transfer and a non-critical interrupt.

8. The processor of claim 1, wherein the power management logic is further to:
   in response to one or more critical break events, terminate the reduced power state prior to the expiration of the exit timer.

9. The processor of claim 8, wherein the one or more critical break events comprise at least one of an advanced programmable interrupt controller (APIC) timer, a time stamp counter (TSC) deadline timer, a virtualization timer, a high precision event timer (HPET), and a vertical blanking interval interrupt (VBI).

10. The processor of claim 1, wherein the power management logic is further to:
    determine whether the reduced power state is below a specific threshold power state.

11. The processor of claim 1, wherein the power management logic is further to:
    determine whether bus traffic is below a defined threshold level.

12. A processor comprising:
    a plurality of cores; and
    power management logic to:
        determine a platform latency tolerance for a system comprising a plurality of components;
        set an exit timer for a reduced power state by subtracting a wake time from the platform latency tolerance;
        defer one or more non-critical break events until a termination of the reduced power state; and
        terminate the reduced power state in response to an expiration of the exit timer.

13. The processor of claim 12, wherein the power management logic is further to:
    initiate the reduced power state in the system.

14. The processor of claim 12, wherein the power management logic is further to:
    obtain a plurality of latency tolerance requirements from the plurality of components; and
    determine the platform latency tolerance based on the plurality of latency tolerance requirements.

15. The processor of claim 12, wherein the wake time is an amount of time to transition from the reduced power state to a normal power state.

16. The processor of claim 12, wherein the power management logic is further to:
    terminate the reduced power state in response to one or more critical break events.

17. A method, comprising:
    obtaining, by power management logic of a computing system, latency tolerance information for a plurality of devices associated with the computing system;
    determining a platform latency tolerance based on the latency tolerance information;
    initiating an exit timer to a time period, wherein the time period is calculated by subtracting a wake time from the platform latency tolerance;
    delaying at least one non-critical break event while the computer system is in a reduced power state; and
    in response to an expiration of the exit timer, terminating the reduced power state.

18. The method of claim 17, further comprising: wherein the wake time is an amount of time to transition from the reduced power state to a normal power state.

19. The method of claim 17, wherein obtaining the latency tolerance information for the plurality of devices comprises receiving a plurality of latency tolerance messages from the plurality of devices.

20. The method of claim 17, further comprising,
    in response to a critical break event:
        terminating the reduced power state prior to the expiration of the exit timer;
        processing the critical break event; and
        processing the delayed at least one non-critical break event.

* * * * *

UNITED STATES PATENT AND TRADEMARK OFFICE
CERTIFICATE OF CORRECTION

| | | |
|---|---|---|
| PATENT NO. | : 9,195,292 B2 | Page 1 of 1 |
| APPLICATION NO. | : 13/927746 | |
| DATED | : November 24, 2015 | |
| INVENTOR(S) | : Barnes Cooper et al. | |

It is certified that error appears in the above-identified patent and that said Letters Patent is hereby corrected as shown below:

In the claims,
Column 16:
Line 51, delete "further comprising:".

Signed and Sealed this
Fifteenth Day of March, 2016

Michelle K. Lee
*Director of the United States Patent and Trademark Office*